(12) United States Patent
Gajdarus

(10) Patent No.: US 11,187,592 B2
(45) Date of Patent: Nov. 30, 2021

(54) THERMOCOUPLE ARRANGEMENT AND METHOD FOR MEASURING TEMPERATURES

(71) Applicant: CPT Group GmbH, Hannover (DE)

(72) Inventor: Tomáš Gajdarus, Ostrava (CZ)

(73) Assignee: VITESCO TECHNOLOGIES GMBH, Hanover (DE)

( * ) Notice: Subject to any disclaimer, the term of this patent is extended or adjusted under 35 U.S.C. 154(b) by 106 days.

(21) Appl. No.: 16/614,096

(22) PCT Filed: May 3, 2018

(86) PCT No.: PCT/EP2018/061419
§ 371 (c)(1),
(2) Date: Nov. 15, 2019

(87) PCT Pub. No.: WO2018/210580
PCT Pub. Date: Nov. 22, 2018

(65) Prior Publication Data
US 2020/0173863 A1 Jun. 4, 2020

(30) Foreign Application Priority Data
May 17, 2017 (GB) ...................................... 1707898

(51) Int. Cl.
*G01K 7/02* (2021.01)
*G01K 1/00* (2006.01)
(Continued)

(52) U.S. Cl.
CPC ............... *G01K 7/04* (2013.01); *G01K 13/02* (2013.01); *G01K 13/024* (2021.01); *G01K 2205/04* (2013.01)

(58) Field of Classification Search
USPC .................. 374/179, 148, 144, 166
See application file for complete search history.

(56) References Cited

U.S. PATENT DOCUMENTS

| 5,038,303 A | 8/1991 | Kimura ........................ 364/557 |
| 6,344,747 B1 | 2/2002 | Lunghofer et al. ........... 324/537 |

(Continued)

FOREIGN PATENT DOCUMENTS

| DE | 272448 C | 4/1912 | ............... G01K 7/02 |
| GB | 1 252 754 A | 11/1971 | ............... G01K 7/04 |

(Continued)

OTHER PUBLICATIONS

United Kingdom Search and Examination Report, Application No. 1707898.1, 5 pages, dated Jul. 26, 2017.
(Continued)

*Primary Examiner* — Mirellys Jagan
(74) *Attorney, Agent, or Firm* — Slayden Grubert Beard PLLC

(57) ABSTRACT

A thermocouple arrangement comprising: a first thermocouple including a first thermoelement and a second thermoelement coupled at a first junction, the first junction subject to a first temperature, the second material different from the first material; a second thermocouple including a third thermoelement and a fourth thermoelement coupled to the third thermoelement at a second junction connected to the first thermoelement, the second junction arranged at a second portion subject to a second temperature, the fourth material different from the third material; and a third thermocouple including a fifth thermoelement and a sixth thermoelement coupled to the fifth thermoelement at a third junction connected to the second thermoelement, the third junction arranged at the second portion exposed to the second temperature, the fifth material different from the third material and the fourth material, the sixth material different from the third material, the fourth material, and the fifth material.

12 Claims, 1 Drawing Sheet

(51) Int. Cl.
*G01K 13/00* (2021.01)
*G01K 7/04* (2006.01)
*G01K 13/02* (2021.01)
*G01K 13/024* (2021.01)

(56) References Cited

U.S. PATENT DOCUMENTS

| | | | |
|---|---|---|---|
| 7,175,343 B2 | 2/2007 | Phillips | 374/180 |
| 8,602,643 B2 | 12/2013 | Gardiner | 374/107 |
| 8,608,377 B2 * | 12/2013 | Conti | G01K 7/10 |
| | | | 374/179 |
| 2005/0259719 A1 | 11/2005 | Phillips | 374/179 |
| 2006/0227849 A1 | 10/2006 | Phillips | 374/179 |
| 2011/0299562 A1 * | 12/2011 | Hashemian | G01K 7/18 |
| | | | 374/1 |
| 2012/0008662 A1 | 1/2012 | Gardiner | 374/107 |
| 2016/0349117 A1 | 12/2016 | Castro et al. | 374/179 |
| 2018/0238744 A1 | 8/2018 | Harle et al. | |

FOREIGN PATENT DOCUMENTS

| | | | | |
|---|---|---|---|---|
| JP | 2005233625 A | 9/2005 | | G01K 7/12 |
| SU | 932278 A1 | 5/1982 | | G01K 7/02 |
| WO | 2009/053815 A2 | 4/2009 | | G01K 7/02 |
| WO | 2009/053815 A3 | 6/2009 | | G01K 7/02 |
| WO | 2017/029080 A1 | 2/2017 | | G01K 7/02 |
| WO | 2018/210580 A1 | 11/2018 | | G01K 7/02 |

OTHER PUBLICATIONS

International Search Report and Written Opinion, Application No. PCT/EP2018/061419, 14 pages, dated Jul. 3, 2018.
Japanese Office Action, Application No. 2019559726, 5 pages, dated Nov. 18, 2020.

* cited by examiner

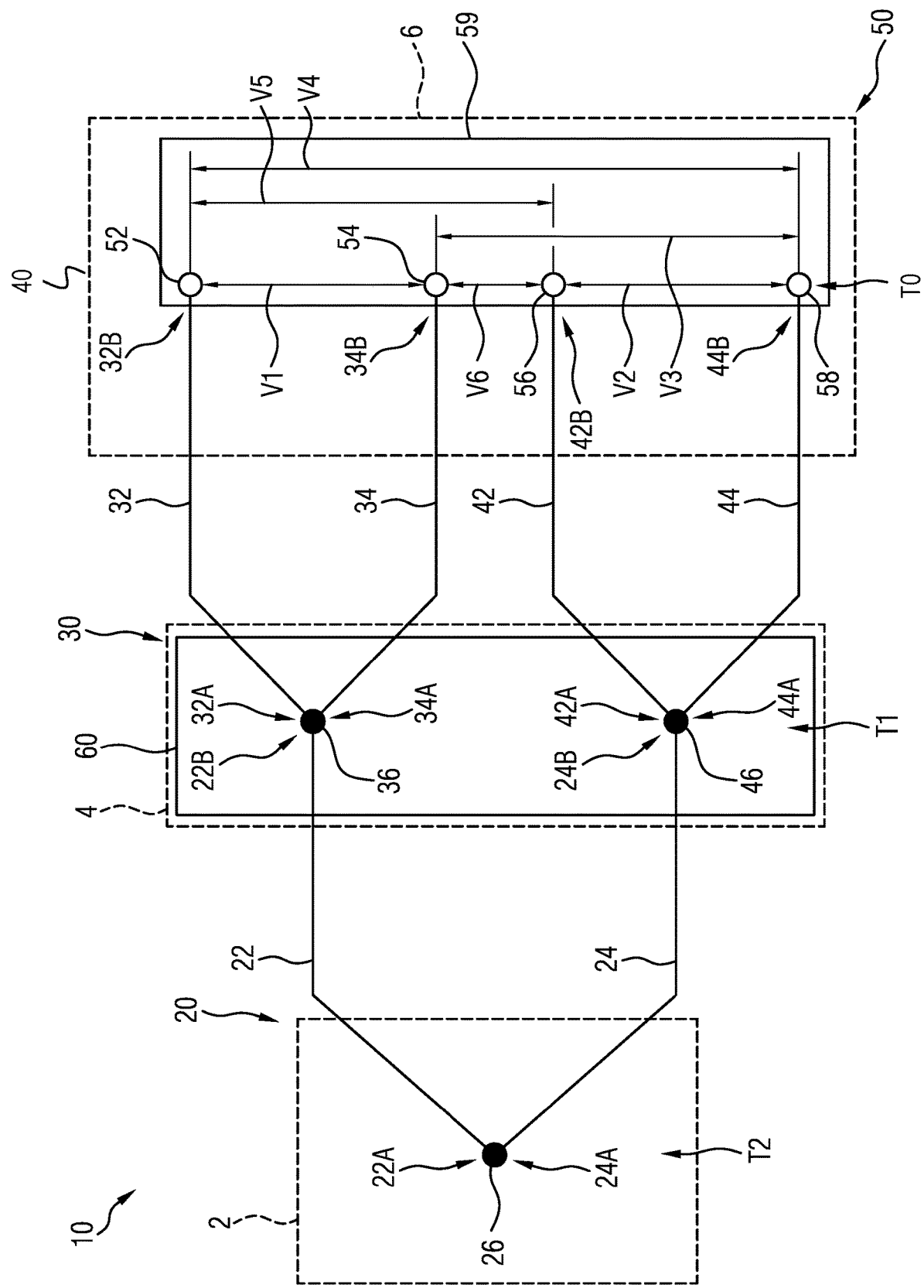

THERMOCOUPLE ARRANGEMENT AND METHOD FOR MEASURING TEMPERATURES

CROSS-REFERENCE TO RELATED APPLICATIONS

This application is a U.S. National Stage Application of International Application No. PCT/EP2018/061419 filed May 3, 2018, which designates the United States of America, and claims priority to GB Application No. 1707898.1 filed May 17, 2017, the contents of which are hereby incorporated by reference in their entirety.

TECHNICAL FIELD

The present disclosure relates to temperature measurement. Various embodiments may include thermocouple arrangements and/or methods for measuring temperatures. Some embodiments include thermocouple arrangements capable of measuring high temperatures, especially in automotive applications, such as in exhaust gas systems of vehicles, and to a method for measuring exhaust gas temperatures.

BACKGROUND

Noble metal thermocouples, such as Type-R (Pt-13% Rh vs. Pt) and Type-S (Pt-10% Rh vs. Pt) thermocouples, among others, may be used for measuring hot gas temperatures in excess of, for instance, 1800° C. For turbine applications, thermocouple probes typically are on the order of 10 cm to 30 cm in length. Noble metal extension wires, thermoelectrically matched or compensating type to the thermoelements of such a thermocouple, may be used to bridge a distance between a distal end of the thermocouple and electrical circuitry configured to receive and process its output. The circuit extension may also include terminal connections to facilitate probe installation and maintenance.

Under certain conditions, it may become necessary to have very long extension wires. This may happen, for example, where the geometry and physical constraints of the object producing the hot gases to be measured, and the location within the object where these hot gases are accessible, are such that the electrical circuitry cannot be placed nearby. For noble metal thermocouples, the extension wires and terminal components may not be commercially available or cost prohibitive for the required length.

U.S. Pat. No. 7,175,343 B2 describes a multi-element thermocouple including two temperature measuring junctions. GB 1 252 754 A describes a thermoelectric device. Further thermoelectric devices are described in, for example, US 2016/0349117 A1, U.S. Pat. Nos. 5,038,303, 8,602,643 B2 and WO 2009/053815 A1.

SUMMARY

The teachings of the present disclosure describe thermocouple arrangements capable of reliably measuring a desired temperature which are more cost efficient. For example, various embodiments include a thermocouple arrangement (10) for measuring a first temperature (T2) of, for example, an exhaust gas passing through an exhaust gas system of an internal combustion engine, the thermocouple arrangement (10) comprising: a first thermocouple (20) including a first thermoelement (22) and a second thermoelement (24) coupled to the first thermoelement (22) at a first junction (26), the first junction (26) being configured to be arranged at a first portion (2) having a first temperature (T2), the first thermoelement (22) being made of a first material, the second thermoelement (24) being made of a second material different to the first material; a second thermocouple (30) including a third thermoelement (32) and a fourth thermoelement (34) coupled to the third thermoelement (32) at a second junction (36) connected to the first thermoelement (22), the second junction (36) being configured to be arranged at a second portion (4) having a second temperature (T1), the third thermoelement (32) being made of a third material, the fourth thermoelement (34) being made of a fourth material different to the third material; and a third thermocouple (40) including a fifth thermoelement (42) and a sixth thermoelement (44) coupled to the fifth thermoelement (42) at a third junction (46) connected to the second thermoelement (24), the third junction (36) being configured to be arranged at the second portion (4) having the second temperature (T1), the fifth thermoelement (42) being made of a fifth material different to the third and fourth materials, the sixth thermoelement (44) being made of a sixth material different to the third, fourth and fifth materials.

In some embodiments, the third material and/or the fourth material and/or the fifth material and/or the sixth material are different to the first material and/or the second material.

In some embodiments, the fifth thermoelement (42) and/or the sixth thermoelement (44) is the same length as the third thermoelement (32) and/or the fourth thermoelement (34).

In some embodiments, the first thermocouple (20) is a type-N thermocouple, the second thermocouple (30) is a type-K thermocouple, and/or the third thermocouple (40) is a type-T or a type-J thermocouple.

In some embodiments, distal ends (32B, 34B, 42B, 44B) of the third, fourth, fifth and sixth thermoelements (32, 34, 42, 44) that are opposite to the second junction (36) and the third junction (46), respectively, are configured to be arranged at a third portion (6) having a third temperature (T0).

In some embodiments, the distal ends (32B, 34B, 42B, 44B) of the third, fourth, fifth and sixth thermoelements (32, 34, 42, 44) are connected to first, second, third and fourth electrical terminals (52, 54, 56, 58), respectively.

In some embodiments, the first temperature (T2) can be estimated based at least partially on at least three voltage differences of a first voltage difference (V1) between the first and second electrical terminals (52, 54), a second voltage difference (V2) between the third and fourth electrical terminals (56, 58), a third voltage difference (V3) between the second and fourth electrical terminals (54, 58), a fourth voltage difference (V4) between the first and fourth electrical terminals (52, 58), a fifth voltage difference (V5) between the first and third electrical terminals (52, 56) and a sixth voltage difference (V6) between the second and third electrical terminal (54, 56).

In some embodiments, there is a mating assembly (60) configured to at least partially receive and/or support the first through sixths thermoelements (22, 24, 32, 34, 42, 44).

In some embodiments, the mating assembly (60) includes an electrically non-conductive plug through which the third thermoelement (32), the fourth thermoelement (34), the fifth thermoelement (42) and the sixth thermoelement (44) pass.

As another example, some embodiments include a method for measuring a first temperature (T2) of, for example, an exhaust gas passing through an exhaust gas system of an internal combustion engine, the method comprising: providing a thermocouple arrangement (10) including: a first thermocouple (20) having a first thermoelement (22) and a second thermoelement (24) coupled to the first thermoelement (22) at a first junction (26), the first junction (26) being configured to be arranged at a first portion (2) having a first temperature (T2), the first thermoelement (22) being made of a first material, the second thermoelement (24) being made of a second material different to the first material; a second thermocouple (30) having a third thermoelement (32) and a fourth thermoelement (34) coupled to the third thermoelement (32) at a second junction (36) connected to the first thermoelement (22), the second junction (36) being configured to be arranged at a second portion (4) having a second temperature (T1), the third thermoelement (32) being made of a third material, the fourth thermoelement (34) being made of a fourth material different to the third material; and a third thermocouple (40) having a fifth thermoelement (42) and a sixth thermoelement (44) coupled to the fifth thermoelement (42) at a third junction (46) connected to the second thermoelement (24), the third junction (36) being configured to be arranged at the second portion (4) having the second temperature (T1), the fifth thermoelement (32) being made of a fifth material, the sixth thermoelement (34) being made of a sixth material different to the fifth material; measuring at least three voltage differences of a first voltage difference (V1) between the third and fourth thermoelements (32, 34), a second voltage difference (V2) between the fifth and sixth thermoelements (42, 44), a third voltage difference (V3) between the fourth and sixth thermoelements (34, 44), a fourth voltage difference (V4) between the third and sixth thermoelements (32, 44), a fifth voltage difference (V5) between the third and fifths thermoelements (32, 42) and a sixth voltage difference (V6) between the fourth and fifth thermoelements (34, 42); and determining the first temperature (T2) at the first junction (26) based at least partially on the at least three measured voltage differences (V1, V2, V3, V4, V5, V6).

BRIEF DESCRIPTION OF THE DRAWING

Further features and aspects of the teachings of the present disclosure are apparent by studying and executing the present disclosure and by consideration of the appended single FIGURE showing a thermocouple arrangement incorporating the teachings herein.

DETAILED DESCRIPTION

The present disclosure describes thermocouple arrangements for measuring a first temperature of, for example, an exhaust gas passing through an exhaust gas system of an internal combustion engine. In some embodiments, the thermocouple arrangement comprises a first thermocouple including a first thermoelement and a second thermoelement coupled (or joined) to the first thermoelement at a first junction (or meeting at the first junction). The first junction is configured to be arranged at a first portion having a first temperature. The first thermoelement is made of a first material, and the second thermoelement is made of a second material different to the first material.

The thermocouple arrangement further comprises a second thermocouple including a third thermoelement and a fourth thermoelement coupled (or joined) to the third thermoelement at a second junction (or meeting at the second junction) connected to the first thermoelement. The second junction is configured to be arranged at a second portion having a second temperature. The third thermoelement is made of a third material, and the fourth thermoelement is made of a fourth material different to the third material. The thermocouple arrangement further comprises a third thermocouple including a fifth thermoelement and a sixth thermoelement coupled (or joined) to the fifth thermoelement at a third junction (or meeting at the third junction) connected to the second thermoelement. The third junction is configured to be arranged at the second portion having the second temperature. The fifth thermoelement is made of a fifth material different to the third and fourth materials, and the sixth thermoelement is made of a sixth material different to the third, fourth and fifth materials.

The present disclosure also describes methods for measuring a first temperature of, for example, an exhaust gas passing through an exhaust gas system of an internal combustion engine. In some embodiments, the method comprises providing a thermocouple arrangement including a first thermocouple. The first thermocouple has a first thermoelement and a second thermoelement coupled (or joined) to the first thermoelement at a first junction (or meeting at the first junction). The first junction is configured to be arranged at a first portion having a first temperature. The first thermoelement is made of a first material, and the second thermoelement is made of a second material different to the first material.

The thermocouple arrangement further includes a second thermocouple having a third thermoelement and a fourth thermoelement coupled (or joined) to the third thermoelement at a second junction (or meeting at the second junction) connected to the first thermoelement. The second junction is configured to be arranged at a second portion having a second temperature. The third thermoelement is made of a third material, and the fourth thermoelement is made of a fourth material different to the third material. The thermocouple arrangement further includes a third thermocouple having a fifth thermoelement and a sixth thermoelement coupled (or joined) to the fifth thermoelement at a third junction (or meeting at the third junction) connected to the second thermoelement. The third junction is configured to be arranged at the second portion having the second temperature. The fifth thermoelement is made of a fifth material different to the third and fourth materials, and the sixth thermoelement is made of a sixth material different to the third, fourth and fifth material.

The method further comprises measuring at least three voltage differences of a first voltage difference between the third and fourth thermoelements, a second voltage difference between the fifth and sixth thermoelements, a third voltage difference between the fourth and sixth thermoelements, a fourth voltage difference between the third and sixth thermoelements, a fifth voltage difference between the third and fifths thermoelements and a sixth voltage difference between the fourth and fifth thermoelements, and determining the first temperature at the first junction based at least partially on the at least three measured voltage differences.

In some embodiments, the third and fourth thermoelements form the second thermocouple and the fifth and sixth thermoelements form the third thermocouple. However, it should be noted that, in view of analyzing the signals of the plurality of thermoelements, each of the third through sixth thermoelements may form a thermocouple with another one of the third through sixth thermoelements. In such case, for instance, the third thermoelement indirectly coupled to the fifth thermoelement via the first and second thermoelements may form a second thermocouple, wherein the fourth thermoelement also indirectly coupled to the sixth thermoelement via the first and second thermoelements may form a third thermocouple. Hence, for forming a thermocouple according to the present disclosure, there may be direct or indirect connections between two thermoelements forming said thermocouple. Further, two thermoelements coupled or joined to one another at or meeting at a junction may form a thermocouple.

In some embodiments, the third material and/or the fourth material and/or the fifth material and/or the sixth material are different to the first material and/or the second material. In some embodiments, the fifth thermoelement and/or the sixth thermoelement is the same length as the third thermoelement and/or the fourth thermoelement.

In some embodiments, the first thermocouple is a type-N thermocouple, the second thermocouple is a type-K thermocouple and/or the third thermocouple is a type-J or a type-T thermocouple.

In some embodiments, distal ends of the third, fourth, fifth and sixth thermoelements that are opposite to the second junction and the third junction, respectively, are configured to be arranged at a third portion having a third temperature. In such embodiments, the distal ends of the third, fourth, fifth and sixth thermoelements may be connected to first, second, third and fourth electrical terminals, respectively. In some embodiments, the first temperature can be estimated by at least three voltage differences of a first voltage difference between the first and second electrical terminals, a second voltage difference between the third and fourth electrical terminals, a third voltage difference between the second and fourth electrical terminals, a fourth voltage difference between the first and fourth electrical terminals, a fifth voltage difference between the first and third electrical terminals and a sixth voltage difference between the second and third electrical terminals.

In some embodiments, the thermocouple arrangement may further comprise a mating assembly configured to at least partially receive and/or support the first through sixths thermoelements. In some embodiments, the mating assembly includes an electrically non-conductive plug through which the third thermoelement, the fourth thermoelement, the fifth thermoelement and the sixth thermoelement pass.

The single FIGURE shows a thermocouple arrangement 10 incorporating teachings of the present disclosure. The thermocouple arrangement 10 corresponds to a thermocouple assembly comprising a first thermocouple 20, a second thermocouple 30 and a third thermocouple 40. The first thermocouple 20, the second thermocouple 30 and the third thermocouple 40 each share components with one another.

The first thermocouple 20 may comprise a primary thermocouple including a first thermoelement 22 and a second thermoelement 24. In some embodiments, the first thermoelement 22 and/or the second thermoelement 24 each are formed of a noble metal or a noble alloy.

For example, the first thermoelement 22 (negative voltage) may be made of a first material, such as, for instance, a Nickel-Silicium (NiSi) alloy. The second thermoelement 24 (positive voltage) may be made of a second material different to the first material, such as, for instance, a Nickel-Chromium-Silicium (NiCrSi) alloy.

Thus, the first thermocouple 20 may comprise an off-the-shelf Type-N thermocouple probe. In some embodiments, the first thermocouple 20 may comprise an off-the-shelf Type-R thermocouple probe. In some embodiments, the first and second thermoelements 22, 24 belong to a non-letter designated thermocouple. An example of this may be to have the first thermoelement 22 formed of platinum and the second thermoelement 24 formed of palladium. In yet another embodiment, the first and second thermoelements are at least partially deposited on, and/or at least partially supported by, a thermally conductive and electrically non-conductive substrate.

In some embodiments, the first and second thermoelements 22, 24 may each be less than 30 cm in length. In some embodiments, the first and second thermoelements 22, 24 are less than 20 cm in length.

In some embodiments, the first thermoelement 22 includes a first proximal end 22A and a first distal end 22B opposite to the first proximal end 22A. The second thermoelement 24 includes a second proximal end 24A and a second distal end 24B opposite to the second proximal end 24A. The first proximal end 22A and the second proximal end 24A are connected or coupled to one another at a first junction 26. In some embodiments, the first junction 26 is arranged at a first portion 2 having a first temperature T2. The first portion 2 may be, for example, a portion of an exhaust gas duct through which exhaust gas of an internal combustion engine (not shown) passes. With the thermocouple arrangement 10 of the single FIGURE, during use, the temperature T2 of the exhaust gas may be determined. The first temperature T2 may be a high temperature, for example, up to 2100° C.

The distal ends 22B, 24B of the first and second thermoelements 22, 24, respectively, are spaced from one another and, in some embodiments, are both at a second portion 4 having a second temperature T1 different to the first temperature T2.

In some embodiments, the second thermocouple 30 is an auxiliary thermocouple including a third thermoelement 32 and a fourth thermoelement 34. In some embodiments, the third thermoelement 32 and/or the fourth thermoelement 34 each are formed of a base metal or a base alloy. For example, the third thermoelement 32 (positive) may be made of a third material, such as, for instance, a Copper-Nickel (CuNi) alloy. The fourth thermoelement 34 (negative) may be made of a fourth material different to the third material, such as, for instance, an iron (Fe) alloy.

Thus, it is noted that neither the third nor fourth thermoelements 32, 34 is formed of the same material as the first thermoelement 22. In some embodiments, neither the third nor fourth thermoelements 32, 34 is formed of the same material as the second thermoelement 24. For example, the second thermocouple may comprise a Type-K thermocouple.

In some embodiments, the third thermoelement 32 includes a third proximal end 32A and a third distal end 32B opposite to the third proximal end 32A. The fourth thermoelement 34 includes a fourth proximal end 34A and a fourth distal end 34B opposite to the fourth proximal end 24A. The third proximal end 32A and the fourth proximal end 34A are connected to one another at a second junction 36. In some embodiments, the second junction 36 is arranged at the second portion 4 having the second temperature T1. The second temperature T1 may be a medium or high temperature, for example, a temperature between about 150° C. and about 800° C.

The distal ends 32B, 34B of the third and fourth thermoelements 32, 34, respectively, are connected to first and second electrical terminals 52, 54, respectively. The first and second electrical terminals 52, 54 are spaced apart from one another and both may be positioned at a third portion 6 having a known third (reference) temperature T0. In some embodiments, the first and second electrical terminals 52, 54 may be each part of a control unit 50. The control unit 50 including, for example, an A/D converter is configured to receive any signals in the form of electric voltage from the thermocouple arrangement 10 and to calculate and/or estimate the first temperature T2.

In the following description, one embodiment to measure three voltage differences V1, V2 and V3 for determining the first temperature T2 is described and explained in greater detail. However, it is noted that any three voltage differences of the first to sixth voltage differences V1 to V6 (see the single FIGURE) may be measured and analyzed to determine the first temperature T2. In particular, by measuring at least three of the first to sixth voltage differences V1 to V6, the other voltage differences may be calculated and/or derived from said measured voltage differences. For example, the fourth voltage difference V4 may be calculated by the following equations:

$$V4=V2+V6+V1$$

$$V4=V2+V5$$

$$V4=V1+V3$$

During operation, the first and second electrical terminals 52, 54 define between them a first voltage difference V1 indicative of a temperature difference (T1−T0) between the second temperature T1 and the third temperature T0. Therefore, the second thermocouple 30 is configured to provide information for determining the second temperature (which can be also referred to as a transition temperature) T1, provided that the third temperature (which may be also referred to as a reference temperature) T0 is known, from the following equation:

$$V1 = S_{34} \cdot (T1-T0)$$

wherein $S_{34}$ is the mean relative Seebeck coefficient of the materials "3" and "4" between temperatures T0 and T1, which in this instance correspond to the third thermoelement 32 and the fourth thermoelement 34, respectively.

For instance, the third temperature T0 may be measured by a separate temperature sensor, such as a known NTC temperature sensor. The third temperature T0 may substantially correspond to ambient temperature.

In some embodiments, the third thermocouple 40 is also an auxiliary thermocouple including a fifth thermoelement 42 and a sixth thermoelement 44. In some embodiments, the fifth thermoelement 42 and/or the sixth thermoelement 44 each are formed of a base metal or a base alloy. For example, the fifth thermoelement 42 (positive) may be made of a fifth material different to the third and fourth materials, such as, for instance, a Nickel-Chromium alloy. The sixth thermoelement 44 (negative) may be made of a sixth material different to the third, fourth and fifth materials, such as, for instance, a Nickel-Aluminum alloy.

Thus, it is noted that neither the fifth nor sixth thermoelements 42, 44 is formed of the same material as the first thermoelement 22. In some embodiments, neither the fifth nor sixth thermoelements 42, 44 is formed of the same material as the second thermoelement 24. In addition, neither the fifth nor sixth thermoelements 42, 44 is formed of the same material as the third and/or fourth thermoelements 32, 34. For example, the third thermocouple 50 is constituted by a type-K thermocouple.

The fifth thermoelement 42 includes a fifth proximal end 42A and a fifth distal end 42B opposite to the fifth proximal end 42A. The sixth thermoelement 44 includes a sixth proximal end 44A and a sixth distal end 44B opposite to the sixth proximal end 44A. The fifth proximal end 42A and the sixth proximal end 44A are connected to one another at a third junction 46. In some embodiments, the third junction 46 is arranged at the second portion 4 having the second temperature T1.

The distal ends 42B, 44B of the fifth and sixth thermoelements 42, 44, respectively, are connected to third and fourth electrical terminals 56, 58, respectively. The third and fourth electrical terminals 56, 58 are spaced apart from one another and both may be positioned at the third portion 6 having the known third (reference) temperature T0. In some embodiments, the third and fourth electrical terminals 56, 58 may be each part of the control unit 50.

During operation, the third and fourth electrical terminals 56, 58 define between them a second voltage difference V2 also indicative of the temperature difference (T1−T0) between the second temperature T1 and the third temperature T0. Therefore, the third thermocouple 40 is also configured to provide information for determining the second temperature (which can be also referred to as the transition temperature) T1, provided that the third temperature (which may be also referred to as a reference temperature) T0 is known, from the following equation:

$$V2 = S_{56} \cdot (T1-T0)$$

wherein $S_{56}$ is the mean relative Seebeck coefficient of the materials "5" and "6" between temperatures T0 and T1, which in this instance correspond to the fifth thermoelement 42 and the sixth thermoelement 44, respectively.

In some embodiments, the first and second voltage differences V1 and V2 (both of which are indicative of the second temperature T1) may be used for redundantly determining the second temperature T1. This allows for a plausibility check of the second temperature T1 by determining the same based on the first and second voltage differences V1, V2. For instance, if the first and second voltage differences V1, V2 deviates from one another for more than a predetermined voltage threshold, the second and/or third thermocouples 30, 40 may be detected as not working properly. In such case, maintenance of the thermocouple arrangement 10, particularly of the second and/or third thermocouples 30, 40, may be necessary. Further, aging and/or chemical robustness of the thermocouple arrangement 10 may be monitored, as the thermocouple arrangement 10 is sensitive to an imbalance created by aging or chemical contamination.

During operation, the second electrical terminal 54 and the third electrical terminal 56 define between them a third voltage difference V6 indicative of a temperature difference (T2−T1) between the first temperature T2 and the second temperature T1. Therefore, the first thermocouple 20 is configured to provide information that helps to determine the relevant first temperature T2 according to the following equation:

$$V3 = S_{12} \cdot (T2-T1) + S_{45} \cdot (T1-T0)$$

wherein $S_{12}$ is the mean relative Seebeck coefficient of the materials "1" and "2" between temperatures T1 and T2, which in this instance correspond to the first thermoelement 22 and second thermoelement 24, respectively, and $S_{45}$ is the mean relative Seebeck coefficient of the materials "4" and "5" between temperatures T0 and T1, which in this instance correspond to the fourth thermoelement 34 and the fifth thermoelement 42, respectively. The second temperature T1 is calculated by the second and/or third thermocouples 30, 40. For example, the second temperature T1 can be determined as an average value of a first "second temperature T1" determined based on the first voltage difference V1 and a second "second temperature T2" determined based on the second voltage difference V2, provided that the first and second voltage differences V1, V2 do not deviate from one another for more than the predetermined voltage threshold.

With the above equation, applying an appropriate transformation, the first temperature T2 may be calculated by:

$$T2 = T1 + \frac{V3 = S_{45} \cdot (T1 - T0)}{S_{12}}$$

As the materials of the fourth thermoelement 34 and the fifth thermoelement 42 are each different to the materials of the first and second thermoelements 22, 24, the third voltage difference V3 is unequal to zero, provided that the first temperature T2 is equal to the second temperature T1. Such a wiring using different materials for the fourth and fifth thermoelements 34, 42 may be configured in a way to have higher output voltages at the output when having normal engine operating condition, in particular, when T2>T1>T0, compared to a situation where the fourth and fifth thermoelements 23, 42 are made of the same material. However, more postprocessing may be needed within, for example, the control unit 50.

In practice, the calculation may be more complicated than described above, since the relative Seebeck coefficient is a function of temperature. However, constructing a thermocouple arrangement with standard thermocouple materials, such as described in ASTM E230, allows one to use industry accepted E(T) equations and related tolerances.

Thus, upon detecting at least three of the first to sixth voltage differences V1, V2, V3, V4, V5, V6, established equations and/or tables may be used to calculate and/or interpolate, as needed, to estimate the first and second temperatures T2 and T1, respectively. It is further to be noted that the above equations may be adapted to the at least three voltage differences measured.

As seen in the single FIGURE, the third thermoelement 32 and the fourth thermoelement 34 belong to a first voltage difference subcircuit which produces the first voltage difference V1. Similarly, the fifth thermoelement 42 and the sixth thermoelement 44 belong to a second voltage difference subcircuit which produces the second voltage difference V2. Further, the first thermoelement 22, the second thermoelement 24, the fourth thermoelement 34 and the sixth thermoelement 44 belong to a third voltage difference subcircuit which produces the third voltage difference V3. Further, the first thermoelement 22, the second thermoelement 24, the third thermoelement 32 and the sixth thermoelement 44 belong to a fourth voltage difference subcircuit which produces the fourth voltage difference V4. Further, the first thermoelement 22, the second thermoelement 24, the third thermoelement 32 and the fifth thermoelement 42 belong to a fifth voltage difference subcircuit which produces the fifth voltage difference V5. Further, the first thermoelement 22, the second thermoelement 24, the fourth thermoelement 34 and the fifth thermoelement 42 belong to a sixth voltage difference subcircuit which produces the sixth voltage difference V6.

The distal ends 32B, 34B, 42B, 44B of the third, fourth, fifth and sixth thermoelements 32, 34, 42, 44, respectively, are sufficiently electrically isolated from one another to allow measurement of the first open circuit voltage difference V1 between the third thermoelement 32 and the fourth thermoelement 34, allow measurement of the second open circuit voltage difference V2 between the fifth thermoelement 42 and the sixth thermoelement 44, allow measurement of the third open circuit voltage difference V3 between the fourth thermoelement 34 and sixth thermoelement 44, allow measurement of the fourth open circuit voltage difference V4 between the third thermoelement 32 and the sixth thermoelement 44, allow measurement of the fifth open circuit voltage difference V5 between the third thermoelement 32 and the fifth thermoelement 42 and allow measurement of the sixth open circuit voltage difference V6 between the fourth thermoelement 34 and the fifth thermoelement 42.

Significantly, each of the third to sixth thermoelements 32, 34, 42, 44, 52, 54 is common to three voltage difference subcircuits. In particular, the third thermoelement 32 is common to the first, fifth and fourth voltage difference subcircuits. The fourth thermoelement 34 is common to the first, third and sixth voltage difference subcircuits. Similarly, the fifth thermoelement 42 is common to second, fifth and sixth voltage difference subcircuits, and the sixth thermoelement 44 is common to the second, third and fourth voltage difference subcircuits.

The third, fourth, fifth and sixth thermoelements 32, 34, 42, 44 preferably comprise conductors, such as 20 AWG wire, individually insulated and bundled together as a multi-wire flexible cable extending between their proximal ends 32A, 34A, 42A, 44A and their distal ends 32B, 34B, 42B, 44B, respectively.

The lengths of the third, fourth, fifth and sixth thermoelements 32, 34, 42, 44, which effectively serve as extension wires, preferably are anywhere from less than 20 cm to several meters. The resulting thermocouple arrangement 10 is suitable for measuring a high, unknown first temperature T2 by making at least two, preferably three, voltage measurements, using the first thermocouple 20 that is cascaded, via its first thermoelement 22, with the second thermocouple 30 and the third thermocouple 40 each configured to measure the second (transition) temperature T1.

By using an appropriate calibration process, the teachings of the present disclosure may be applied to any thermocouple arrangement having a structure as shown in the single FIGURE with the third through sixth thermoelements 32, 34, 42, 44 being made of different materials. The thermocouple arrangement 10 may be used to measure temperatures with the first thermocouple 20 proximate to the hostile environment, and the second (auxiliary) thermocouple 20 and/or third thermocouple 40 extending from a leg of the first (primary) thermocouple 20 to a remote location where the electrical connectors 52, 54, 56, 58 are positioned. This allows for using readily available base metal extension wires and connectors (second thermocouple 30 and third thermocouple 40), which provides cost advantages when using a noble metal first (primary) thermocouple 20. Such base metal extensions may also allow for using non-letter designated noble metal first thermocouples in situations where matched lead wires and connectors are not available.

In some embodiments, such as that shown in the single FIGURE, the second junction 36 the third junction 46 may be both at the same temperature, namely at the second temperature T1. In some embodiments, the second and third junctions 36, 46 simply may be positioned close to one another to help ensure that the same (transition) temperature T1 is experienced. In some embodiments, in addition to simply being proximate to one another, a mating assembly 60 is provided that supports portions of one at least one of the first through sixth thermoelements 22, 24, 32, 34, 42, 44. In some embodiments, the mating assembly 60 is such that the second and third junctions 36, 46 are electrically isolated from one another, yet are still in thermal communication with each other so that they are able to experience a common temperature T1. The mating assembly 60 may include an electrically non-conductive plug through which the third thermoelement 32, the fourth thermoelement 34, the fifth thermoelement 42 and the sixth thermoelement 44 pass.

The electrical terminals 52, 54, 56, 58 at which the distal ends 32B, 34B, 42B, 44B of the third, fourth, fifth and sixth thermoelements 32, 34, 42, 44, respectively, terminate, may be all at a same, and known, third (reference) temperature T0. In some embodiments, the electrical terminals 52, 54, 56, 58 are mounted on a termination strip 59 which may be also part of the control unit 50. The temperature of the termination strip 59 may be temperature controlled to maintain the termination strip 59 at the predetermined reference temperature T0. In some embodiments, an auxiliary thermometer may be used to gauge the temperature at the terminals 52, 54, 56, 58 and the output of this thermometer is used as the reference temperature T0 in the equations above to determine the first temperature T2 at the first junction 26.

During use, the electrical terminals 52, 54, 56, 58 provide the first to sixth voltage differences V1, V2, V3, V4, V5, V6 to additional electrical circuitry which may be part of the control unit 50, known to those skilled in the art. This additional circuitry may, among other things, sense the first to sixth voltage differences V1, V2, V3, V4, V5, V6 and convert it into analog and/or digital signals, at least one of which may carry information that is proportional to the first temperature T2 for further processing. Thus, a processor associated with this circuitry may be configured to use at least three voltage differences of the first to sixth voltage differences V1 to V6 to determine the second temperature T1 and, from that, the first temperature T2. The first temperature T2, which is then determined as a function of time, may then be used to provide real-time control of the equipment creating that temperature, such as, for instance, an internal combustion engine used in combination with a vehicle, such as, for example, an automobile, a commercial vehicle, a truck, a farming vehicle, etc.

Some embodiment of the teachings of the present disclosure are specifically illustrated and/or described herein. However, it will be appreciated that modifications and variations of those embodiments are covered by the above teachings and within the purview of the appended claims without departing from the spirit and intended scope of the disclosure.

What is claimed is:

1. A thermocouple arrangement for measuring a first temperature, the thermocouple arrangement comprising:
   a first thermocouple including a first thermoelement comprising a first material and a second thermoelement comprising a second material, the second thermoelement coupled to the first thermoelement at a first junction, the first junction configured at a first portion subject to a first temperature, the second material being different from the first material;
   a second thermocouple including a third thermoelement comprising a third material and a fourth thermoelement comprising a fourth material, the fourth thermoelement coupled to the third thermoelement at a second junction connected to the first thermoelement, the second junction arranged at a second portion subject to a second temperature, and the fourth material being different from the third material; and
   a third thermocouple including a fifth thermoelement comprising a fifth material and a sixth thermoelement comprising a sixth material, the sixth thermoelement coupled to the fifth thermoelement at a third junction connected to the second thermoelement, the third junction arranged at the second portion exposed to the second temperature, and the fifth material being different from the third material and the fourth material, and the sixth material being different from the third material, the fourth material, and the fifth material.

2. The thermocouple arrangement of claim 1, wherein at least one of the third material, the fourth material, the fifth material, and the sixth material is different from at least one of the first material and the second material.

3. The thermocouple arrangement of claim 1, wherein at least one of the fifth thermoelement and the sixth thermoelement has an equal length as at least one of the third thermoelement and the fourth thermoelement.

4. The thermocouple arrangement of claim 1, wherein the first thermocouple comprises a type-N thermocouple.

5. The thermocouple arrangement of claim 1, wherein the second thermocouple comprises a type-K thermocouple.

6. The thermocouple arrangement of claim 1, wherein the third thermocouple comprises a type-T or a type-J thermocouple.

7. The thermocouple arrangement of claim 1, further comprising a mating assembly configured to support the first through sixths thermoelements.

8. The thermocouple arrangement of claim 7, wherein the mating assembly includes an electrically non-conductive plug through which the third thermoelement, the fourth thermoelement, the fifth thermoelement and the sixth thermoelement pass.

9. The thermocouple arrangement of claim 1, wherein distal ends of the third, fourth, fifth, and sixth thermoelements opposite to the second junction and the third junction, respectively, are arranged at a third portion exposed to a third temperature.

10. The thermocouple arrangement of claim 9, wherein the distal ends of the third, fourth, fifth and sixth thermoelements are connected to first, second, third, and fourth electrical terminals, respectively.

11. The thermocouple arrangement of claim 10, wherein the first temperature is estimated based at least three differences selected from the group consisting of:
   a first voltage difference between the first and second electrical terminals;
   a second voltage difference between the third and fourth electrical terminals;
   a third voltage difference between the second and fourth electrical terminals;
   a fourth voltage difference between the first and fourth electrical terminals;
   a fifth voltage difference between the first and third electrical terminals; and
   a sixth voltage difference between the second and third electrical terminal.

12. A method for measuring a first temperature using a thermocouple arrangement including: a first thermocouple including a first thermoelement comprising a first material and a second thermoelement comprising a second material, the second thermoelement coupled to the first thermoelement at a first junction, the first junction configured at a first portion subject to a first temperature, and the second material being different from the first material; a second thermocouple including a third thermoelement comprising a third material and a fourth thermoelement comprising a fourth material, the fourth thermoelement coupled to the third thermoelement at a second junction connected to the first thermoelement, the second junction arranged at a second portion subject to a second temperature, and the fourth material being different from the third material; and a third thermocouple including a fifth thermoelement comprising a fifth material and a sixth thermoelement comprising a sixth material, the sixth thermoelement coupled to the fifth thermoelement at a third junction connected to the second thermoelement, the third junction arranged at the second portion exposed to the second temperature, and the fifth material being different from the third material and the fourth material, and the sixth material being different from the third material, the fourth material, and the fifth material, the method comprising:

measuring at least three voltage differences selected from the group consisting of: a first voltage difference between the third and fourth thermoelements, a second voltage difference between the fifth and sixth thermoelements, a third voltage difference between the fourth and sixth thermoelements, a fourth voltage difference between the third and sixth thermoelements, a fifth voltage difference between the third and fifth thermoelements, and a sixth voltage difference between the fourth and fifth thermoelements; and determining the first temperature at the first junction based at least partially on the at least three measured voltage differences.

\* \* \* \* \*